UNITED STATES PATENT OFFICE.

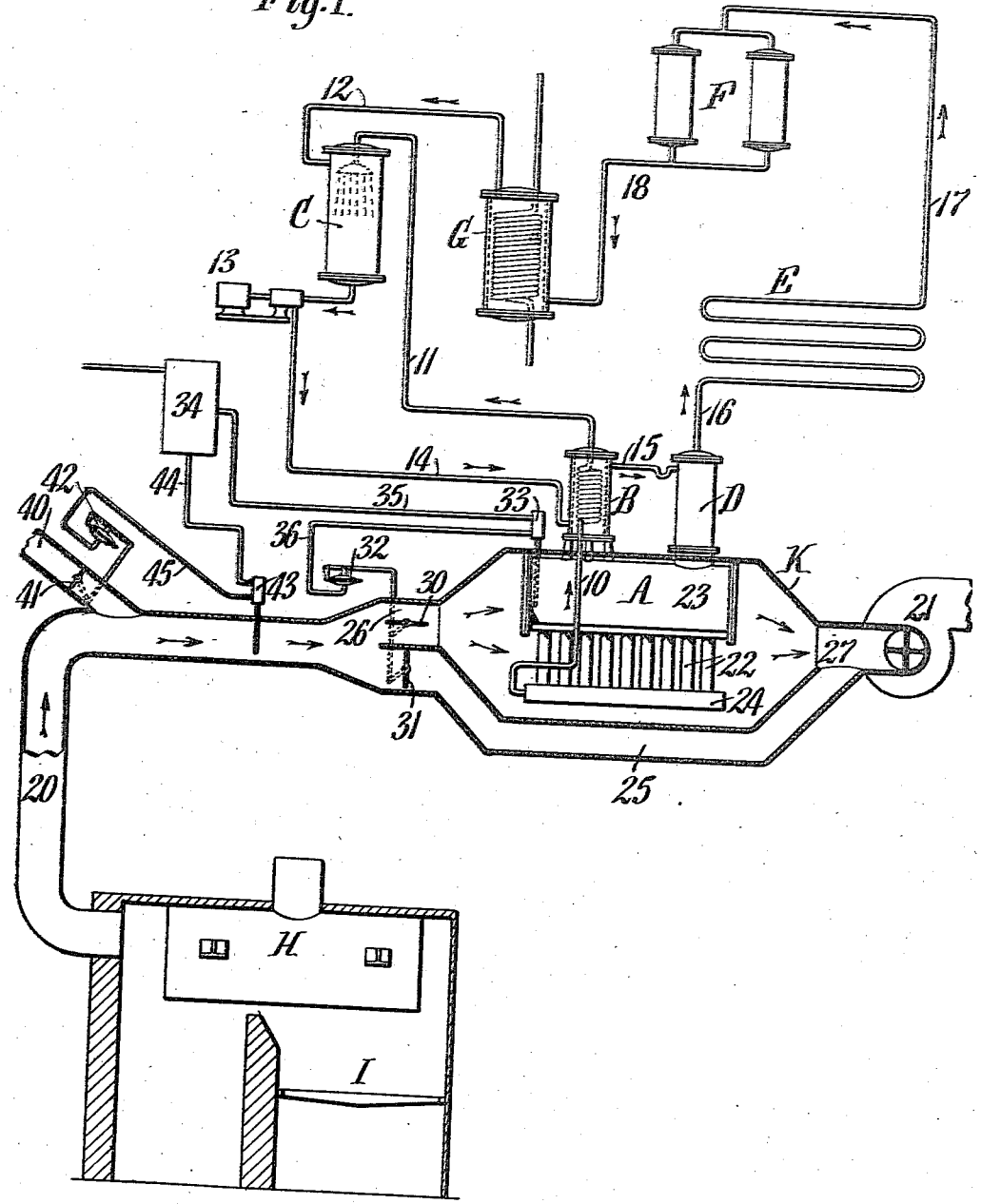

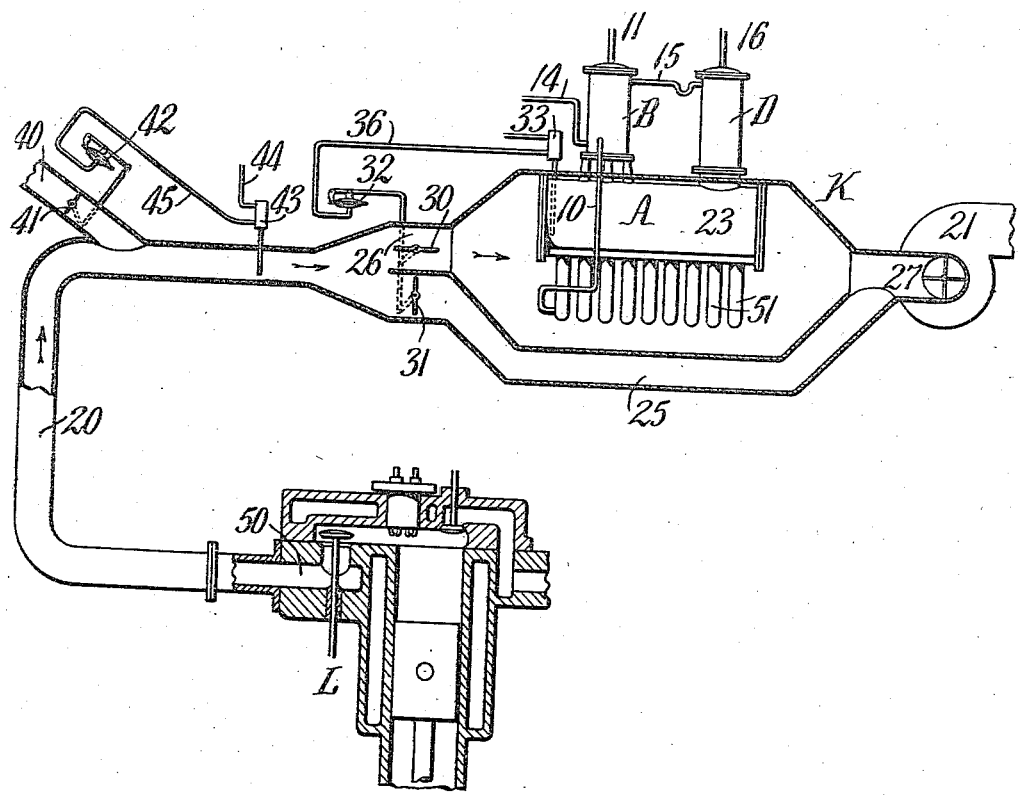

HARRY S. DAVIS, OF BUFFALO, NEW YORK, ASSIGNOR OF ONE-HALF TO DANIEL E. KNOWLTON, OF BUFFALO, NEW YORK.

AMMONIA-STILL.

1,015,145.  Specification of Letters Patent.  Patented Jan. 16, 1912.

Application filed January 27, 1908. Serial No. 412,697.

*To all whom it may concern:*

Be it known that I, HARRY S. DAVIS, a citizen of the United States, residing at Buffalo, in the county of Erie and State of New York, have invented a new and useful Improvement in Ammonia-Stills, of which the following is a specification.

This invention relates to ammonia stills, such as are used, for instance, in the absorption process of refrigeration in which during the cycle of operations the expanded ammonia gas, after having exerted its refrigerating effect, is absorbed by weak aqua ammonia, and the strong aqua ammonia so formed is conveyed to a still or generator in which the ammonia gas is separated from the water by the application of heat.

The object of my invention is to heat the ammonia still or generator in an efficient and inexpensive way and to that end the still is heated by the hot waste gases or products of combustion of a steam boiler or internal combustion engine, the supply of such waste heat to the still or generator being so regulated that the desired temperature is maintained without danger of overheating the still.

In the accompanying drawings, consisting of two sheets: Figure 1 is a diagrammatic illustration, partly in section, of a refrigerating system embodying this invention in which the still is heated by the waste gases from a boiler furnace. Fig. 2 is a sectional elevation of the still and connecting parts of a system in which the waste gases from an internal combustion engine are utilized for heating the still.

Like reference characters refer to like parts in both figures.

Referring to Fig. 1, A represents the ammonia still which may be of any suitable or well known construction and which is combined with the usual members of an absorption system of refrigeration in any usual or suitable manner. The additional members illustrated in the figure are the following: B represents the exchanger which is provided with a coil to which the weak liquor is conducted from the still by a pipe 10. C represents the absorber to which the weak liquor flows from the exchanger B through a pipe 11 and in which this liquor is sprayed and brought into contact with the ammonia gas which is supplied to the absorber by a pipe 12. The weak liquor absorbs the gas and the strong liquor so formed is pumped to the exchanger B by a pump 13 and pipe 14. D represents the analyzer through which the gas passes from the still and in which it deposits entrained liquid. The liquor passes from the exchanger B to the analyzer by a pipe 15 and from the analyzer to the still. The gas passes from the analyzer D by a pipe 16 to the rectifying coil E, from the latter by a pipe 17 to the condensers F and from the latter by a pipe 18 to the cooler G in which the liquefied gas expands and cools the refrigerating solution which circulates through the coil in the cooler and the refrigerating pipes connected therewith. The gas passes from the cooler G to the absorber C by the pipe 12. H represents the steam boiler, I the furnace thereof and 20 the pipe through which the hot waste gases escape from the furnace. This pipe is connected with a heating casing or chamber K in which the still A is arranged so as to be heated by the hot gases flowing through this chamber. A fan 21 is connected with the outlet of this chamber, if necessary, to expedite the flow of the hot gases. For providing the still with a large and efficient heating surface the still A is preferably provided with depending tubes 22 which connect the body 23 of the still with a bottom chamber or header 24. 25 represents a by-pass or passage which connects the inlet passage 26 of the heating chamber K directly with its outlet passage 27, so that a portion of the hot gases can be sent directly to the outlet without passing through the heating chamber, if the volume of hot gases is greater than that which is required for producing the desired heating effect.

The supply of hot gases to the heating chamber is regulated by a damper 30 arranged in the inlet 26 of the heating chamber and a damper 31 arranged in the by-pass 25, which dampers are so arranged that one is closed when the other is open. The position of these dampers is automatically regulated by an actuating or shifting device 32 which is controlled by a thermostat 33 extending into the still. The damper actuating device 32 is preferably of the type which comprises a movable diaphragm or piston operated by compressed air which is supplied to a tank or reservoir 34, and which passes from said tank to the thermostat by a pipe 35 and from the latter to the actuating device by a pipe 36. If the temperature in the still rises above the normal the supply damper 30 is correspondingly closed and the by-pass damper 31 correspondingly opened. If the temperature in the still drops below the normal the reverse action takes place.

In order to prevent the heating chamber K from being supplied with gas at such an excessively high temperature that the temperature of the still cannot be satisfactorily controlled by the described damper mechanism, the heat conduit or pipe 20 is provided with an air inlet 40 through which air can be admitted to this pipe for reducing the temperature of the hot gases before the latter reach the still. This air inlet is provided with a damper 41 which is actuated by a shifting device 42, similar to the device 32, and a thermostat 43 extending into the smoke pipe 20. Compressed air passes to the thermostat from the tank 34 by a pipe 44 and from the thermostat to the actuating device 42 by a pipe 45. The thermostat 43 is so adjusted that when the temperature in the pipe 20 exceeds the permissible limit it causes the opening of the damper 41 in the air inlet 40 to such an extent as to reduce the temperature to the proper point.

The steam boiler H furnishes the steam for the machinery of the cold storage warehouse, brewery or other establishment in which the refrigerating apparatus is used. The hot waste gases from the boiler furnace furnish the heat for the ammonia still and as the temperature of these gases is considerably above that which is maintained in the still and the volume of the gases is comparatively large, the desired heating effect is readily produced without requiring the consumption of additional fuel, thus effecting an important economy in the process, while the cost of the apparatus is not materially increased.

In the apparatus represented in Fig. 2, the heating chamber K in which the still A is arranged is supplied with hot gases from an internal combustion engine L, the exhaust port 50 of which is connected with the pipe 20 by which the hot gases are conducted to the heating chamber of the still. In the construction of the still represented in this figure, the body 23 is provided with depending tubes 51 which are closed at their lower ends.

Stills of the construction herein shown and described are suitable for the purpose but I do not wish to limit myself to the same since the construction may be varied in many ways without departing from the invention.

I claim as my invention:

1. The combination with an ammonia still, of an apparatus in which fuel is burned, a heating chamber for the still, a conduit for conducting the hot gases from such apparatus to said chamber, said conduit being provided with an air inlet and a by-pass, dampers in said conduit and by-pass, automatic means for controlling said dampers by the temperature of the still, a damper controlling said air inlet, and automatic means for controlling said damper by the temperature of the gases in said conduit, substantially as set forth.

2. The combination with an ammonia still, of an apparatus in which fuel is burned, a conduit for the hot gases passing off from the fuel, a heating chamber for the still which receives the hot gases from said conduit, means thermostatically controlled by the temperature of the still for regulating the supply of hot gases to the still, and means thermostatically controlled by the temperature of the hot gases in the conduit for admitting air to said conduit, substantially as set forth.

3. The combination with an ammonia still, of an apparatus in which fuel is burned, a conduit for the hot gases passing off from the fuel, a heating chamber for the still located in said conduit through which said gases are adapted to pass, a by-pass in said conduit leading around said chamber, means thermostatically controlled by the temperature of said still for regulating the supply of the hot gases to said chamber and to said by-pass, and means thermostatically controlled by the temperature of the hot gases in the conduit for admitting air to the conduit, substantially as set forth.

Witness my hand in the presence of two subscribing witnesses.

HARRY S. DAVIS.

Witnesses:
EDWARD WILHELM,
C. B. HORNBECK.